MIN-KAO TANG.
SLIDE RULE.
APPLICATION FILED APR. 22, 1919.

1,411,541.

Patented Apr. 4, 1922.
2 SHEETS—SHEET 1.

WITNESSES:
H. T. Shelhamer
J. H. Miller

INVENTOR
Min-Kao Tang
BY
J. H. Procter
ATTORNEY

MIN-KAO TANG.
SLIDE RULE.
APPLICATION FILED APR. 22, 1919.

1,411,541.

Patented Apr. 4, 1922.
2 SHEETS—SHEET 2.

WITNESSES:
H. J. Shelhamer
J. Miller

INVENTOR
Min-Kao Tang
BY
J. M. Procter
ATTORNEY

UNITED STATES PATENT OFFICE.

MIN-KAO TANG, OF WILKINSBURG, PENNSYLVANIA.

SLIDE RULE.

1,411,541.  Specification of Letters Patent.  Patented Apr. 4, 1922.

Application filed April 22, 1919. Serial No. 291,928.

*To all whom it may concern:*

Be it known that I, MIN-KAO TANG, a citizen of the Republic of China, and a resident of Wilkinsburg, in the county of Allegheny and State of Pennsylvania, have invented a new and useful Improvement in Slide Rules, of which the following is a specification.

My invention relates to slide rules and particularly to helical slide rules.

One object of my invention is to provide a helical slide rule that shall have means whereby it need be turned through only a minimum angle to perform any of the various mathematical calculations usually performed with slide rules.

A further object of my invention is to provide a slide rule that shall be relatively compact, simple and inexpensive to construct and relatively more accurate than ordinary slide rules of the same length.

Ordinary helical slide rules comprise two helical members having co-operating logarithmic scales thereon. With such an arrangement, the same accuracy may be obtained with a ten inch rule that is obtained with a twenty inch ordinary slide rule depending upon the number of scales thereon. However, the operation of manipulating such a rule is rather tedious because some calculations require the relative turning of the two co-operating helical members quite a number of times to cause them to assume proper relative positions. To overcome this, it has been proposed to construct two cylindrical telescoping members with co-operating helical scales. With this arrangement, it is difficult to cause the scales to register properly and the advantages of fewer manual operations in manipulating the rule are overcome by the decreased accuracy.

In view of the above, I provide two co-operating helical members having the ordinary logarithmic scales thereon. A transparent cylindrical finder member surrounds the helical members and is provided with a single line or a plurality of indicating lines which co-operate with the scales to permit any computation to be obtained with a minimum relative movement of the helical members.

Figure 1:
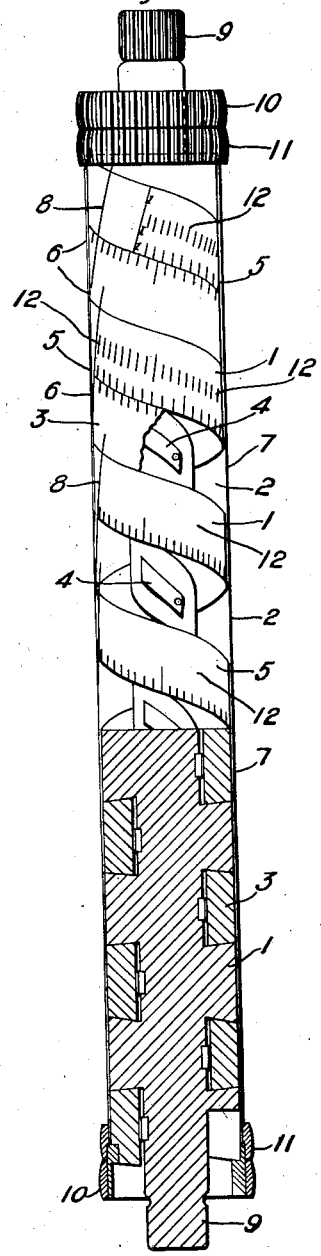
Figure 2:
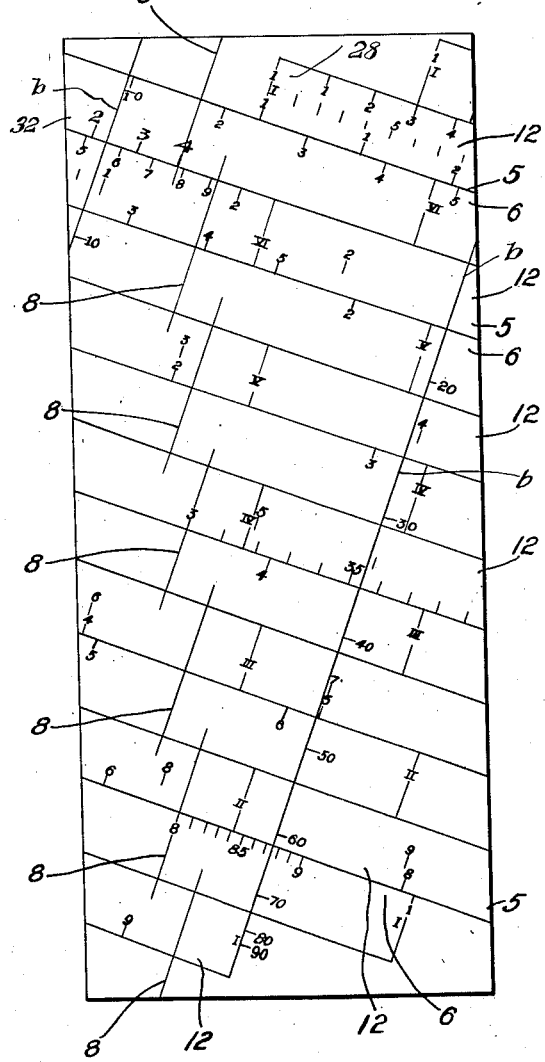
Figure 3:
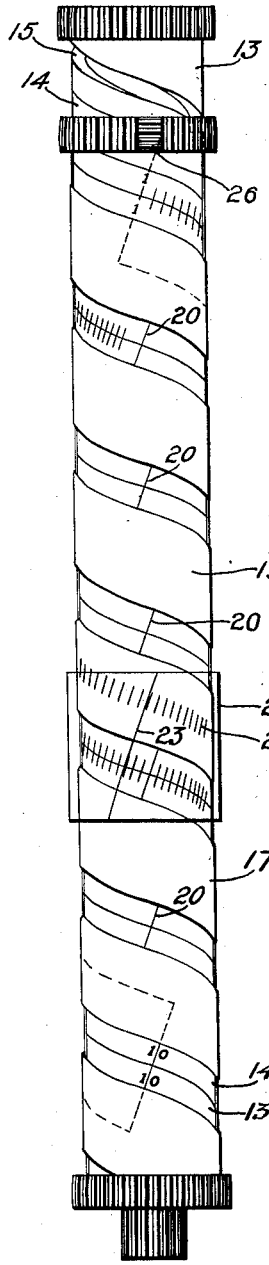
Figure 4:
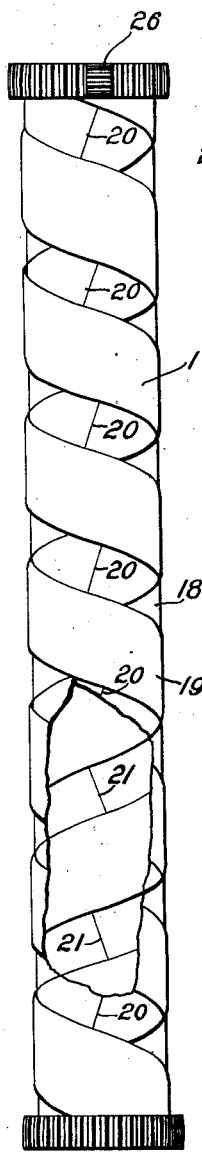
Figure 6:
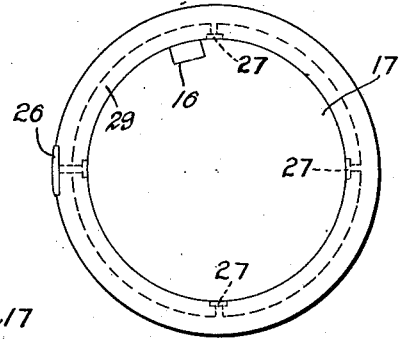
Figure 5:
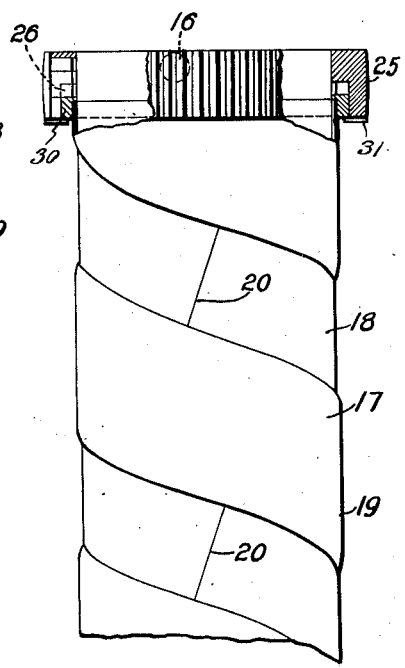
Figure 7:
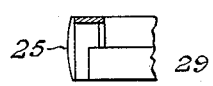
Figure 8:

Figure 1 of the accompanying drawings is a view, partially in section, partially in elevation and partially broken away, of a helical slide rule embodying my invention; Fig. 2 is a development of the scales marked on the various elements of the rule shown in Fig. 1; Fig. 3 is an elevational view of a modified form of helical slide rule embodying my invention; Fig. 4 is a view of the finder shown in Fig. 3 with parts broken away; Fig. 5 is a detail view, partially in elevation and partially in section, of the finder shown in Fig. 4; Fig. 6 is a top plan view of the knurled ring of the finder shown in Figs. 3, 4 and 5, and Figs. 7 and 8 are detail sectional views of the rings shown in Fig. 6.

In Figure 1 of the drawings, a member 1 is provided with a helical groove 2 in which is disposed a helical member 3. The member 1 is provided with springs 4 in the grooves 2 thereof for compensating for changes in the expansion of the members 1 and 3 caused by change in temperature. Co-operating logarithmic scales 5 and 6 are marked on the members 1 and 3, respectively. On the members 1 and 3 are marked indices I, II, III, IV, V, VI and I each of which is displaced an equal distance from the next index. The indices are all adapted to be visible from one side of the rule substantially as shown. A transparent cylindrical member 7 or other suitable structure is disposed around the members 1 and 3 and is provided with indicating lines or pointers 8 that are equally spaced with respect to each other and which cooperate with the scales 5 and 6, as hereinafter set forth, to facilitate the reading of the rule with a minimum manipulation thereof. Knurled buttons or handles 9 are provided for the portion 1 of the rule, knurled head members 10 are provided for the portion 3 of the rule and knurled head members 11 are provided for the transparent cylindrical member 7. The members 9, 10 and 11 are provided to facilitate actuating the relatively movable members 1, 3 and 7 of the rule.

The development shown in Fig. 2 of the drawings illustrates the positions of the lines 8 in performing the problem of three divided by eight. In other words, with the devices as shown in Figs. 1 and 2, the member 7 is turned until one of its lines 8 registers with the number three on the scale 5 of the member 1. Then the knobs 10 are turned until the portion 3 of the rule is in such position that the number eight on the scale 6 thereof registers with one of the lines 8. The quotient will be found coinciding with the index line III that is three indices from the index I or, in other words, the point .375 on scale 5.

That the quotient coincides with the index III is obtained from the fact that the dividend 3 and the divisor 8 are three indicating lines apart equal to the distance between the indices III and I, that is, from the nature of the logarithmic scales the displacement of the quotient from the end of the index I must always be equal to the displacement of the dividend from the divisor. In other words, the quotient of any two numbers under the same indicating line will be found coinciding with the index I; under every second indicating line with the index II; and under every third indicating line with the index III.

The transparent or other similar cylindrical tube 7 may have a scale or scales such as shown by $b$ in Fig. 2, marked thereon for co-operating with a uniform scale 12 on the member 1 to indicate the sines of the angles marked thereon. Of course, the angles may be marked on the tube to co-operate with the logarithmic scales on members 1 and 3 as is the case in ordinary slide rules.

In order to perform a problem in multiplication, the process of division is reversed, referring again to Fig. 2 which illustrates the problem of .375 multiplied by 8, it is only necessary to set one of the indices on the member 1 such as III in the figure adjacent the multiplicand .375. Then the lines 8 are moved until one of the same registers with the multiplier on scale 5. The product 3 is found coinciding with one of the lines 8 as many indicating lines apart from the multiplier as indicated by the number of the index coinciding with the multiplicand. The multiplicand is the displacement of the product from the multiplier which is equal to the displacement of the multiplicand from the index I.

From the above it will be seen that it is not necessary to turn the members 1 and 3 more than 360° with respect to each other nor is it necessary to turn the member 7 more than that amount to obtain any reading. In other words, it is not necessary to advance the members 1 and 3 more than one turn to perform any problem in division or multiplication. If the tube or finder 7 is provided with a scale $b$ as shown, corresponding to the sine scale on ordinary slide rules, the sines may be read directly from the scale 28 on the member 1 when the members 1 and 7 are in correct position. That is, by rotating the member 7 until the scale $b$ intersects the scale 28 on member 1, then the corresponding sines are read from the scale 28 at the point of intersection of the scale 28 and the scale $b$.

In order to increase the space for scales of such a rule, I provide a rule as shown in Figs. 3, 4, 5 and 6 having a finder structure so modified as to permit scales of the same length as the rule which are co-operative with the scales on the other members.

The rule shown in Figs. 3, 4, 5 and 6 comprises two co-operating helical members 13 and 14 similar to the members 1 and 3 of Fig. 1. However, the member 13 is provided with a helical groove or thread 15 thereon for a relatively short distance to receive a pin 16 in a cylindrical member 17 that surrounds the members 13 and 14.

The member 17 comprises a transparent cylindrical member 18 with opaque portions 19 thereon. The portions 18 and 19 are helical and thus are of such shape that the scales on the members 13 and 14 are exposed. Indicating lines 20 and 21 are marked on the transparent portions 18 of the tube at equal distances apart. In other words, the lines 20 are on one side and the lines 21 on the other side of the tube as shown clearly in Fig. 4 of the drawings.

With this arrangement, the lines 20 and 21 correspond to the lines 8 of the device shown in Fig. 1 and thus the manipulation is the same with the exception that the maximum movement of the finder is reduced to 180° by reason of the additional series of indicating lines 21 on the finder. It is clear from Fig. 2 that the greater the number of indicating lines the less will be the movement required of the co-operating movable members as this movement may be reduced to 90° or other smaller angle. Also, if the number of indicating lines be decreased, the required movement is increased.

It also is clear from Fig. 3 that with the finder so modified as shown in Figs. 4, 5 and 6, the rule comprises three helical members 13, 14 and 19, any two of which may be used as co-operating members and the third to perform the function of the finder with its indices I, II, III, etc., as indicating lines, because the same relative movement of members 13 and 14 necessary to perform any problem can be obtained with members 13 and 19 and 14 and 19. Thus, with this arrangement, the flexibility and the space for arranging various scales are greatly increased.

A transparent runner 22 having a line 23 marked thereon may be disposed around the rule for co-operating with scales on the portion 19 of the rule and with the scales on the members 13 and 14.

The member 17 is provided with a knurled head ring 25 having the pin 16 therein that is received by the groove 15 in the member 13 and also a ring 30 which is disposed in a recess 29 in the ring 25. With this arrangement, the portion 18 is always maintained adjacent the scales of the members 13 and 14. However, to insure this, the ring 25 is movable with respect to the member 17 and a clamp or pin 26 is provided for co-operating with slots 27 in the member 17 for clamping the same together. Thus, the tube 17 may be turned independently of the lateral movement thereof along the rule to insure correct registering of the scales with the transparent portion 18 of the tube. A washer 31 is provided adjacent the bottom of the ring 25 to prevent the members 30 and 17 from coming out of the ring 25.

With my invention, the length of the rule need be only one half that of an ordinary rule for equal accuracy with an ordinary rule and the movements and, consequently, the time required to manipulate are greatly reduced.

My invention is not limited to the structures illustrated, as various modifications may be made within the spirit and scope of the invention, as set forth in the appended claims.

I claim as my invention:

1. A slide rule comprising two cooperating helical members having continuous scales thereon, and a transparent member surrounding the helical members and having a number of equally-spaced indicating lines thereon for cooperating with the scales, the number of indicating lines being equal to the number of turns in one of the helical members.

2. A slide rule comprising two cooperating helical members having continuous scales thereon, and a plurality of indicating lines for cooperating with the scales, the number of indicating lines being equal to the number of turns in one of the helical members.

3. A helical slide rule comprising two helically-disposed cooperating scales having indices corresponding to the turns of the scales, and a finder therefor having a plurality of indicating lines thereon corresponding to the indices.

4. A helical slide rule comprising two helically-disposed cooperating scales having indices corresponding to the turns of the scales, and a transparent member surrounding the helical scales having a plurality of indicating lines thereon equal to the indices of one of the scales.

5. A slide rule comprising two helically-disposed cooperating scales having equally spaced indices corresponding to the number of turns of the scales, and an indicating line for each index.

6. A slide rule comprising two helically-disposed cooperating scales each one of which is provided with a plurality of indices numbered in accordance with the number of the turn of the scale, and an indicating line for each index.

7. A slide rule comprising two helically-disposed cooperating scales each one of which is provided with a plurality of equally spaced indices numbered in accordance with the number of the turn of the scale, and a transparent member surrounding the scales and having indicating lines thereon equal in number to the indices of one of the scales.

8. A slide rule comprising two helically-disposed cooperating scales each one of which is provided with a plurality of equally spaced indices numbered in accordance with the number of the turn of the scale, and a transparent member surrounding the scales and having equally spaced indicating lines thereon equal in number to the indices of one of the scales.

9. A slide rule comprising two helically-disposed continuous logarithmic scales, a transparent member surrounding the scales and a plurality of equally spaced indicating lines thereon corresponding to the turns in the scales.

10. A slide rule comprising two helically-disposed continuous logarithmic scales each having an index for each turn and a transparent finder having such indicating lines thereon that the mathematical computations of division and multiplication may be performed without turning the scales more than 360° with respect to each other.

11. A slide rule comprising two helically-disposed continuous logarithmic scales each having an index for each turn and a transparent finder having such indicating lines thereon that all computations are obtained with a rotative movement of one scale of less than one turn.

12. A slide rule comprising cooperating continuous logarithmic scales having a plurality of indices so spaced that there is one index for each turn of each scale equally spaced with respect to the first and last index of each scale and a finder for the rule having an indicating line thereon for each index.

In testimony whereof, I have hereunto subscribed my name this 19th day of April 1919.

MIN-KAO TANG.